United States Patent
Osgood et al.

(10) Patent No.: US 11,560,803 B1
(45) Date of Patent: Jan. 24, 2023

(54) COMPONENT WITH COOLING PASSAGE FOR A TURBINE ENGINE

(71) Applicant: GENERAL ELECTRIC COMPANY, Schenectady, NY (US)

(72) Inventors: Daniel Endecott Osgood, Loveland, OH (US); Kirk Douglas Gallier, Cincinnati, OH (US); Zachary Daniel Webster, Mason, OH (US); Gregory Terrence Garay, West Chester, OH (US); Daniel Lee Durstock, Fort Wright, KY (US); Ricardo Caraballo, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/520,146

(22) Filed: Nov. 5, 2021

(51) Int. Cl.
*F01D 5/18* (2006.01)
*F01D 5/08* (2006.01)

(52) U.S. Cl.
CPC .............. *F01D 5/187* (2013.01); *F01D 5/085* (2013.01); *F05D 2250/713* (2013.01); *F05D 2260/201* (2013.01); *F05D 2260/202* (2013.01); *F05D 2260/232* (2013.01)

(58) Field of Classification Search
CPC .... F01D 5/187; F01D 5/085; F05D 2260/201; F05D 2260/202; F05D 2260/232
See application file for complete search history.

(56) References Cited

U.S. PATENT DOCUMENTS

| | | | | |
|---|---|---|---|---|
| 4,672,727 A | * | 6/1987 | Field | B23P 15/02 29/889.721 |
| 4,676,719 A | * | 6/1987 | Auxier | B23K 26/384 415/115 |
| 4,726,735 A | * | 2/1988 | Field | F01D 5/186 415/115 |
| 5,419,039 A | | 5/1995 | Auxier et al. | |
| 5,486,093 A | | 1/1996 | Auxier et al. | |
| 5,779,437 A | | 7/1998 | Abdel-Messeh et al. | |
| 6,164,912 A | * | 12/2000 | Tabbita | F01D 5/186 416/97 R |
| 6,254,334 B1 | | 7/2001 | LaFleur | |
| 6,955,522 B2 | * | 10/2005 | Cunha | F01D 5/186 415/115 |
| 6,994,521 B2 | | 2/2006 | Liang | |
| 7,056,093 B2 | | 6/2006 | Self et al. | |
| 7,789,626 B1 | | 9/2010 | Liang | |

(Continued)

*Primary Examiner* — Eldon T Brockman
(74) *Attorney, Agent, or Firm* — McGarry Bair PC

(57) ABSTRACT

An engine component for a turbine engine having a working airflow separated into a cooling airflow and a combustion airflow, the engine component comprising a wall defining an interior and having an outer surface over which flows the combustion airflow, the outer surface defining a first side and a second side. The engine component further comprising at least one cooling conduit provided in the interior and having conduit sidewalls and a set of cooling passages formed in the wall and fluidly coupling the at least one cooling conduit to the outer surface, at least one of the cooling passages in the set comprising a primary cooling passage portion and a secondary cooling passage portion. A diffusion slot located in the primary cooling passage portion and an impingement zone fluidly coupled to the diffusion slot.

20 Claims, 15 Drawing Sheets

(56) References Cited

U.S. PATENT DOCUMENTS

| | | | |
|---|---|---|---|
| 8,057,182 B2 * | 11/2011 | Brittingham | F01D 5/186 |
| | | | 415/115 |
| 8,657,576 B2 * | 2/2014 | Tibbott | F01D 5/187 |
| | | | 416/96 R |
| 8,678,751 B2 | 3/2014 | Tibbott et al. | |
| 10,294,798 B2 | 5/2019 | Propheter-Hinckley et al. | |
| 10,914,177 B2 | 2/2021 | Varney | |
| 2009/0317258 A1 * | 12/2009 | Tibbott | F01D 5/187 |
| | | | 416/97 R |
| 2010/0129231 A1 * | 5/2010 | Brittingham | F01D 5/186 |
| | | | 416/97 R |
| 2018/0135446 A1 | 5/2018 | Propheter-Hinckley et al. | |

* cited by examiner

US 11,560,803 B1

COMPONENT WITH COOLING PASSAGE FOR A TURBINE ENGINE

TECHNICAL FIELD

The disclosure generally relates to a cooling passage for an engine, and more specifically to a set of cooling passages for cooling an upstream edge of an airfoil.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Gas turbine engines for aircraft are designed to operate at high temperatures to maximize engine efficiency, so cooling of certain engine components, such as the high pressure turbine and the low pressure turbine, can be beneficial. Typically,cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades and other engine components generally include one or more interior cooling circuits for routing the cooling air through the engine component to cool different portions of the engine component, and can include dedicated cooling circuits for cooling different portions of the engine component

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
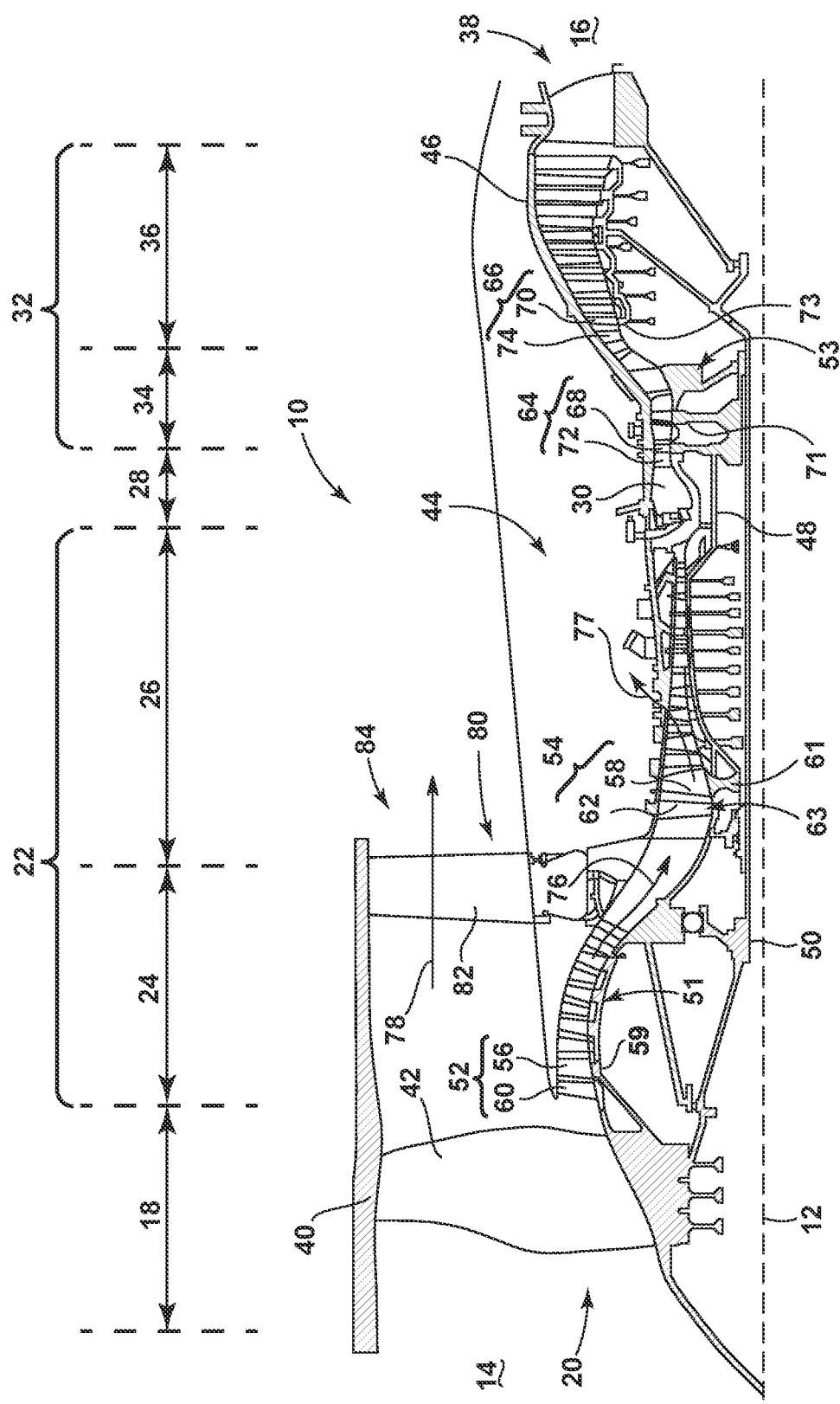
FIG. 1 is a schematic, cross-sectional diagram of a gas turbine engine for an aircraft.

Aspects of the disclosure described herein are directed to a cooling hole provided in an engine component. More specifically, the disclosure is directed toward one or more cooling holes provided in an airfoil proximate an edge of an engine component. For purposes of illustration, the present disclosure will be described with respect to the upstream edge of a turbine blade for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications. Dedicated cooling circuits utilizing the cooling holes described herein can be implemented in airfoil parts including, but not limited to a leading edge, trailing edge, or tip of an airfoil. Other engine portions contemplated include, but are not limited to, a platform edge, end wall, or the like.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. As used herein, substantially means within 5%.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The HP and LP spools 48, 50 are rotatable about the engine first centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The rotating compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple rotating turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The rotating turbine blades 68, 70 for a stage of the turbine can be mounted to a turbine rotor disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor.

A remaining portion of airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
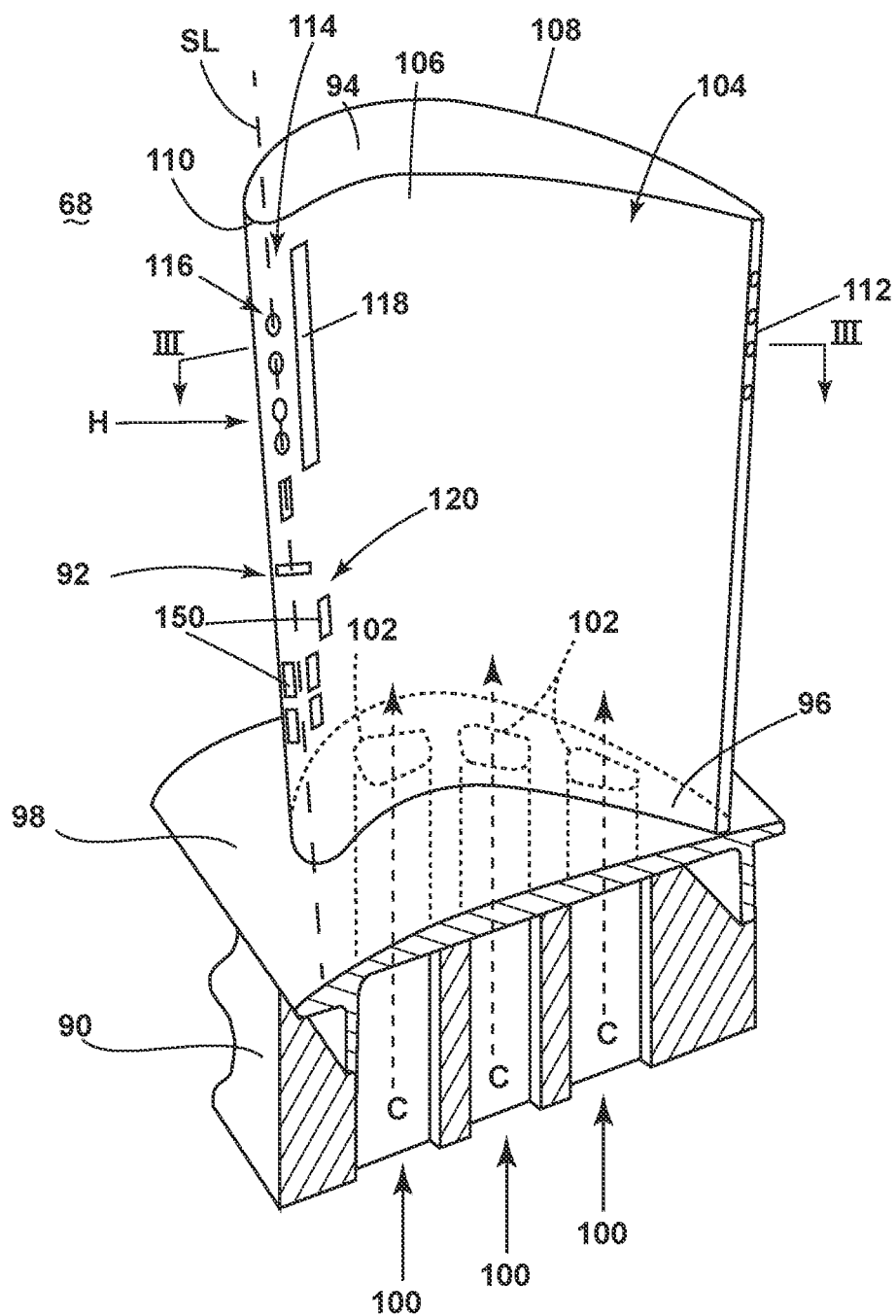
FIG. 2 is a perspective view of an airfoil of the engine of FIG. 1 in the form of a blade including a set of cooling passages.

Referring now to FIG. 2, an engine component in the form of one of the turbine blades 68 of the engine 10 from FIG. 1 is shown. Alternatively, the engine component can be a vane, a strut, a service tube, a shroud, or a combustion liner in non-limiting examples, or any other engine component that can require or utilize cooling passages. The turbine blade 68 includes a dovetail 90 and an airfoil 92. The dovetail 90 further includes at least one inlet passage 100, shown as a three exemplary inlet passages 100, each extending through the dovetail 90 to provide internal fluid communication with the airfoil 92 at a supply outlet 102. It should be appreciated that the dovetail 90 is shown in cross-section, such that the inlet passages 100 are housed within the body of the dovetail 90. The dovetail 90 can be configured to mount to the turbine rotor disk 71 on the engine 10 of FIG. 1, for example.

The airfoil 92 extends radially between a tip 94 and a root 96 defining a span-wise direction therebetween. The airfoil 92 mounts to the dovetail 90 at a platform 98 at the root 96. The platform 98 helps to radially contain the turbine engine mainstream airflow. Additionally, the airfoil 92 includes an outer wall 104 including a first side 106 and a second side 108, and extending between an upstream edge 110 and a downstream edge 112 to define a streamwise direction therebetween. It should be understood that the upstream edge 110 can be a leading edge of the airfoil 92 and the downstream edge 112 can be a trailing edge of the airfoil 92. Further, the first side 106 can be a pressure side and the second side 108 can be a suction side of a turning vane as illustrated. It is also further contemplated that the airfoil 92 can be a non-turning vane, by way of non-limiting example a frame fairing. It is also further contemplated that neither the first or second sides 106, 108 are curved to form a pressure side and/or suction side.

In operation, a hot gas flow (H), such as a combustor flow, can pass along the exterior of the outer wall 104 of the airfoil 92. A cooling fluid flow (C) can be provided to the inlet passages 100 and into the airfoil 92 at the supply outlets 102, passing into the airfoil 92. A stagnation line (SL) is located where the hot gas flow (H) contacts the airfoil 92 at an angle of ninety degrees and the velocity of the hot gas flow (H) is zero. An edge of the airfoil 92 can be defined by a change in angle of equal to or between 15 and 135 degrees across an arc-length of 0.5 inches. The edge can be a sharp angle change such as a machined edge of an engine component, by way of non-limiting example where the tip 94 meets the first side 106 or the second side 108, or a fillet or blend as is the case in the airfoil 92 at the upstream edge 110. In other non-limiting examples the edge can be the downstream edge 112, a forward, side, or aft end of the platform 98, the root 96, or other areas of the engine component where an angle change occurs along an arc-length. In some implementations the angle change can be equal to or between 45 and 135 degrees. In some cases the stagnation line (SL) is co-linear with the upstream edge 110, however it should be understood that the stagnation line (SL) can vary a certain degree along the upstream edge 110. Furthermore, the stagnation line (SL) can temporarily or permanently vary from all or part of the upstream edge (110) during all or part of the operational conditions. In some implementations there is no stagnation line (SL) at all.

A set of cooling passages 114 can exhaust proximate the upstream edge 110. The set of cooling passages 114 can include a variety of cooling passages and orientations thereof. The cooling fluid flow (C) can be provided throughout the airfoil 92 and exhausted from the set of cooling passages 114 as a cooling film. At least one of the cooling passages of the set of cooling passages 114 can be a stagnation cooling passage 116. The stagnation cooling passage 116 can be located along the stagnation line (SL) or the upstream edge 110 depending on implementation. For the airfoil 92 as described herein, the stagnation cooling passage 116 is located along the stagnation line (SL). An outlet slot 118 can be provided at or near the upstream edge 110. The outlet slot 118 can flank the stagnation cooling passage 116 such that another outlet slot can be provided on the other side of the stagnation cooling passage 116, but is obscured by the perspective view of FIG. 2.

At least one of the cooling passages of the set of cooling passages 114 can be a slot cooling passage 120. The slot cooling passage 120 can open onto the outer wall along the stagnation line (SL) or proximate upstream edge 110. Further, the slot cooling passage 120 can be oriented in either a streamwise or span-wise direction. It is further contemplated that the slot cooling passages 120 flank the stagnation line (SL). The slot cooling passage 120 can also exhaust into the outlet slot 118 or directly onto the outer wall at a passage outlet 150.

The set of cooling passages 114 can include any one of or any combination of the stagnation cooling passage 116, outlet slot 118, or slot cooling passage 120. Further, the set of cooling passages 114 can be arranged in a span-wise row. Optionally, another set of cooling passage can be provided on the second side 108, but is obscured by the perspective of FIG. 2.

Figure 3:
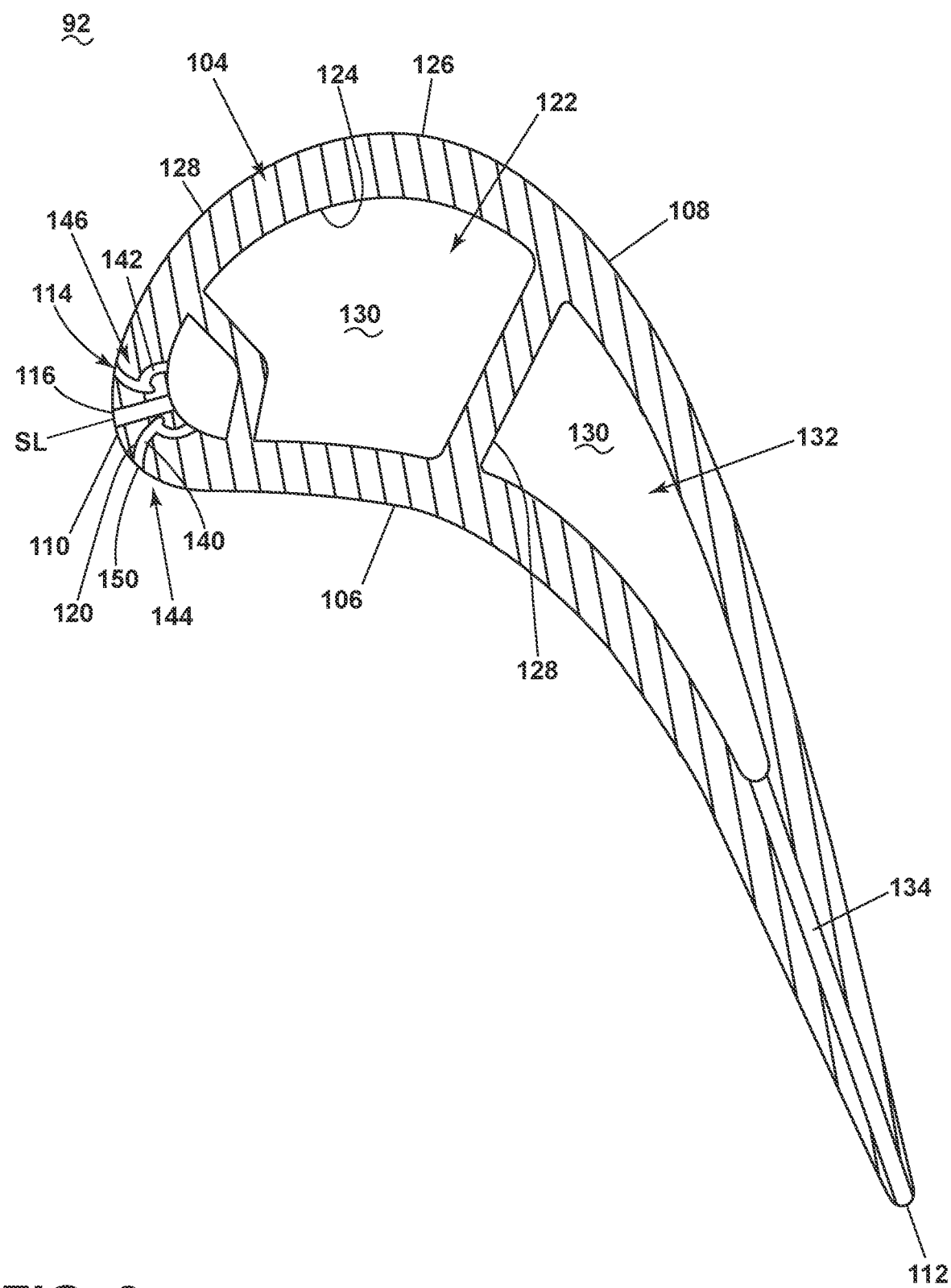
FIG. 3 is a cross-sectional view of the airfoil with the set of cooling passages taken along line of FIG. 2.

Referring now to FIG. 3, showing section of FIG. 2, the outer wall 104 defines an interior 122. The outer wall 104 can have a thickness extending between an inner surface 124 and an outer surface 126, with the inner surface 124 defining the interior 122. At least one rib 128 can extend from the first side 106 of the outer wall 104 to the second side 108 of the outer wall 104, effectively separating the interior 122 into separate cooling conduits 130. The cooling conduits 130 can form at least a portion of a cooling circuit 132 within the interior 122 of the airfoil 92 and supplied by the supply outlets 102. It should be appreciated that the at least one rib 128, the cooling conduits 130, and the cooling circuit 132 as shown are exemplary, and a myriad of different cooling circuits 132 can be formed within the airfoil 92, including, but not limited to one or more of a cooling conduit, channels, passages, ducts, cooling inlets, full-length ribs or partial-length ribs in either the span-wise or streamwise planes, near wall cooling passages, turbulators, pins, fins, or any other structure forming the airfoil 92.

An exhaust hole 134 can be provided in the outer wall 104 at the downstream edge 112. The exhaust hole 134 can fluidly couple the cooling circuit 132, and more specifically an aft cooling conduit 130 to the downstream edge 112 for exhausting a cooling fluid at the downstream edge 112.

The set of cooling passages 114 can fluidly couple the interior 122 to the exterior of the airfoil 92 at the outer surface 126, and provide for exhausting a cooling fluid in the cooling fluid flow (C) near any portion of the airfoil 92 requiring cooling. The set of cooling passages 114 can be formed in the outer wall 104 and fluidly couple at least one of the cooling conduits 130 to the outer surface 126, by way of non-limiting example near the upstream edge 110 as illustrated.

At least one of the cooling passages of the set of cooling passages 114 can include a primary cooling passage portion 140 and a secondary cooling passage portion 142. The primary cooling passage portion 140 can exhaust into the outlet slot 118. Either one of or both of the primary cooling passage portion 140 and the secondary cooling passage portion 142 can be curved as illustrated. The set of cooling passages 114 can include a first side set of cooling passages 144 exhausting onto the first side 106 and a second side set of cooling passages 146 exhausting onto the second side 108. The first and second side sets of cooling passages 144, 146 can flank the upstream edge 110. The set of cooling passages 114 can include the stagnation cooling passage 116 fluidly coupling the interior 122 to the upstream edge 110 at the stagnation line (SL). The first and second side sets of cooling passages 144, 146 can flank the stagnation cooling passage 116.

Figure 4:
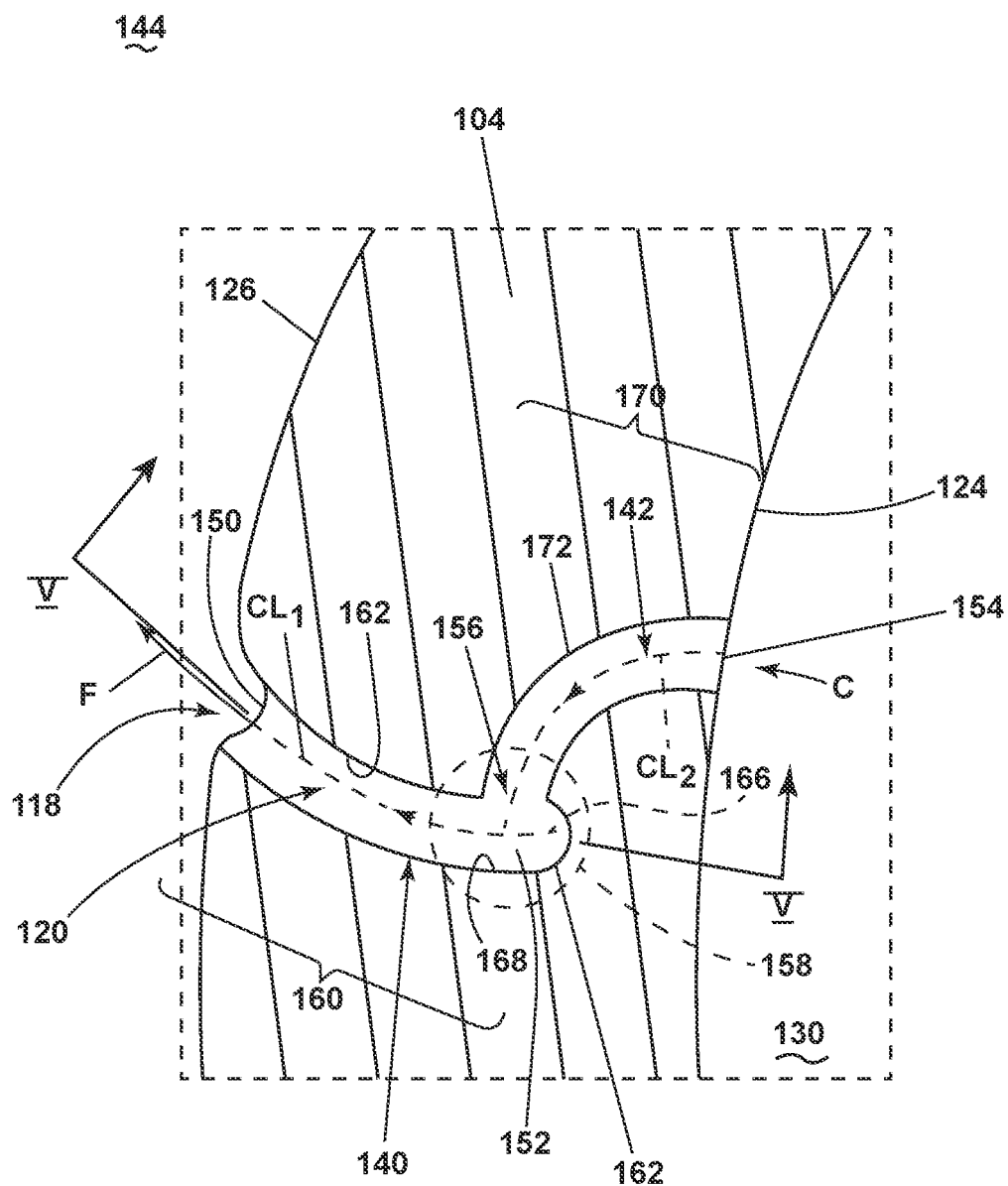
FIG. 4 is an enlarged view of a variation of a cooling passage from the set of cooling passages according to an aspect of the disclosure herein.

FIG. 4 is an enlarged view of a cooling passage, by way of non-limiting example the slot cooling passage 120, of the second side set of cooling passages 144. The slot cooling passage 120 can exhaust into the outlet slot 118. The primary cooling passage portion 140 can have the passage outlet 150 opening onto the outer surface 126. The secondary cooling passage portion 142 can intersect the primary cooling passage portion 140 at a junction 152. The secondary cooling passage portion 142 can have an inlet 154 fluidly coupled to the cooling conduit 130 and an intermediate outlet 156 fluidly connecting the secondary cooling passage portion 142 to the primary cooling passage portion 140 at the junction 152.

The slot cooling passage 120 can extend between the inlet 154 and the passage outlet 150 to define a flow direction (F) illustrated in dashed line between the cooling conduit 130 and the outer surface 126. The primary cooling passage portion 140 can include a diffusion slot 160 having slot sidewalls 162 extending along a first centerline (CL1) in the flow direction (F) between a rear wall 164 and the passage outlet 150. The intermediate outlet 156 can be located proximate the rear wall 164, or spaced from the rear wall 164 as illustrated to define a pocket 166.

The secondary cooling passage portion 142 can define a metering section 170 having a circular cross section, though it could have any cross-sectional shape. The metering section 170 can have a cross-sectional area that is the smallest, or minimum cross-sectional area of the slot cooling passage 120. The metering section 170 can extend along a second centerline (CL2) from the inlet 154 to the intermediate outlet 156. It is further contemplated that the cross-sectional area is maintained as a constant cross-sectional area from the inlet 154 to the intermediate outlet 156. Maintaining a constant cross-sectional area enables a controlled flow of the cooling fluid (C) upon entering the diffusion slot 160.

It is also contemplated that the metering section 170 has no length and is located at any portion of the slot cooling passage 120 where the cross-sectional area is the smallest. It is further contemplated that the inlet 154 can define the metering section 170 without extending into the slot cooling passage 120 at all. The slot cooling passage 120 can include multiple metering sections and is not limited to one as illustrated. The metering section 170 is for metering of the mass flow rate of the cooling fluid (C).

An impingement zone 158 can be formed at the junction 152 by the intersection of the primary cooling passage portion 140 and the secondary cooling passage portion 142. The primary cooling passage portion 140 can define an impingement surface 168 facing the intermediate outlet 156 of the secondary cooling passage portion 142. The impingement zone 158 can include the intermediate outlet 156 and the impingement surface 168 where the cooling fluid (C) exiting the intermediate outlet 156 from the secondary cooling passage portion 142 impinges, or hits.

One of or both of the primary and secondary cooling passage portions 140, 142 can be curved, showing both as curved in FIG. 4. Additionally, the primary and secondary cooling passage portions 140, 142 can curve in opposite directions as illustrated, or can curve in the same direction. Either or both of the primary and secondary cooling passage portions 140, 142 can be curved to include a bend 172, by way of non-limiting example the secondary cooling passage portion 142. The slot cooling passage 120 can include multiple turns, by way of non-limiting example at the junction 152 and the bend 172, resulting in directional changes of the flow direction (F). The junction 152 can be defined by an intersection of the first centerline (CL1) and the second centerline (CL2) which can form a 90-degree angle, while any angle equal to or between 0-degrees and 180-degrees is contemplated.

Figure 5:
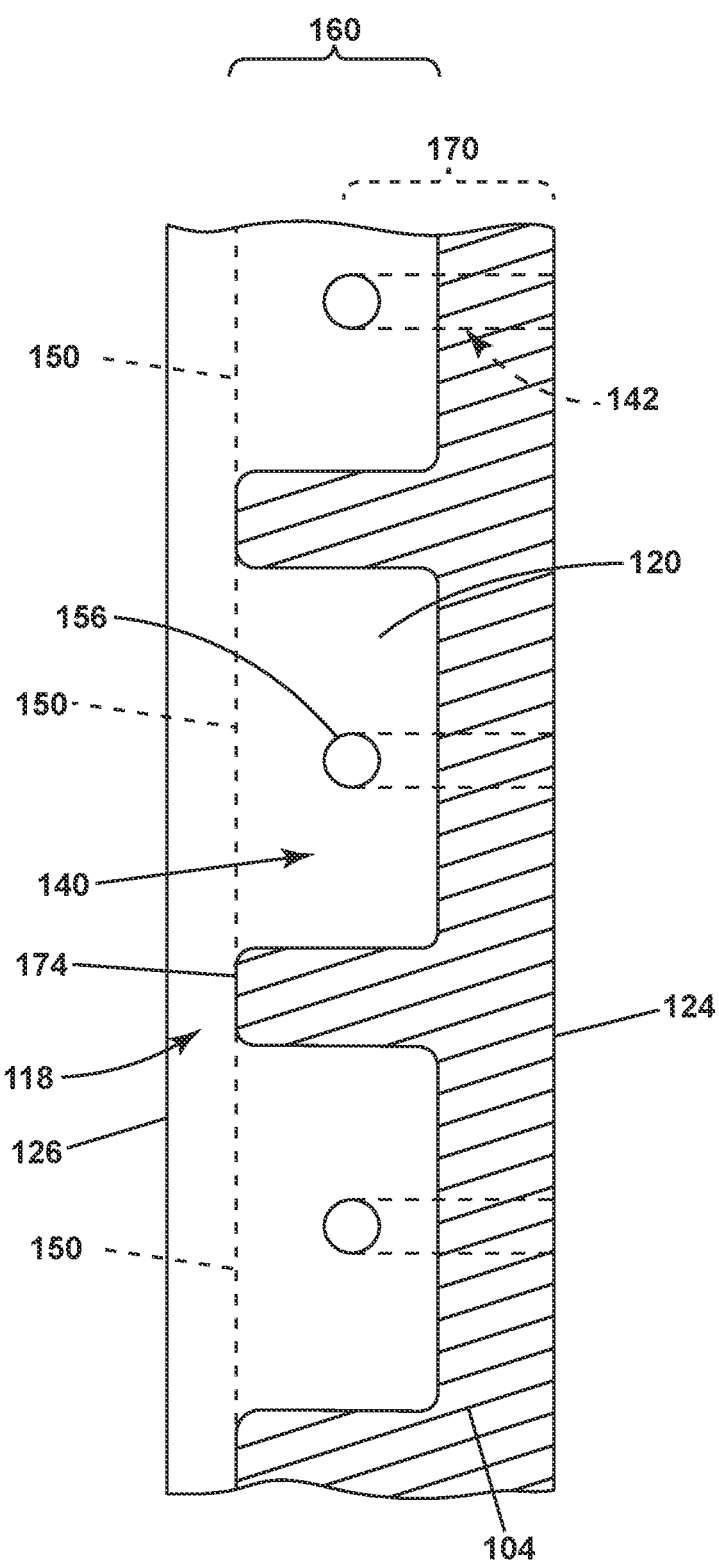
FIG. 5 is a cross-sectional view of the cooling passage from FIG. 4 taken along line V-V of FIG. 4.

Referring now to FIG. 5, showing a cross-sectional view extending in the span-wise direction across section V-V of FIG. 4. The shape of the diffusion slot 160 can be better appreciated with multiple passage outlets 150 exhausting into the outlet slot 118. The diffusion slots 160 can have a rounded-rectangular cross-sectional shape defined along a curved plane. Additionally, other shapes are contemplated such that a fluid exhausted from the intermediate outlet 156 can diffuse in the diffusion slot 160. Non-limiting examples of additional shapes defined in the plane along the diffusion slot 160 can include a rounded-square shape, a triangular shape, a truncated triangular shape, a rounded triangular shape, a circular or semi-circular shape, an oval or a semi-ovular shape, as well as any suitable geometric, linear, curved, curvilinear, or variable shape, or any combination thereof.

Each of the passage outlets 150, shown schematically in dashed line, can be defined upstream of the outer surface 126 of the outer wall 104 and can further define a set of structures 174 between adjacent passage outlets 150 of adjacent diffusion slots 160. The set of structures 174 can be formed as a portion of the outer wall 104 defined between adjacent slot cooling passages 120. In this way, positioning of the passage outlets 150 prior to the outer surface 126 provides for exhausting to the common outlet slot 118. It is further contemplated that the diffusion slots 160 can intersect along their sides, with a smaller or removed set of structures 174. Further, the passage outlets 150 can be provided directly on the outer surface 126 and define the outlet slot 118 or with no outlet slot 118.

The intermediate outlet 156 can have a circular cross-sectional shape extending along and defining a curved, cylindrical conduit for the secondary cooling passage portion 142. Additional cross-sectional shapes for the secondary cooling passage portion 142, and the metering section in general are contemplated, such as having a squared, rounded, oval, or racetrack cross-sectional shape in non-limiting examples.

Figure 6:
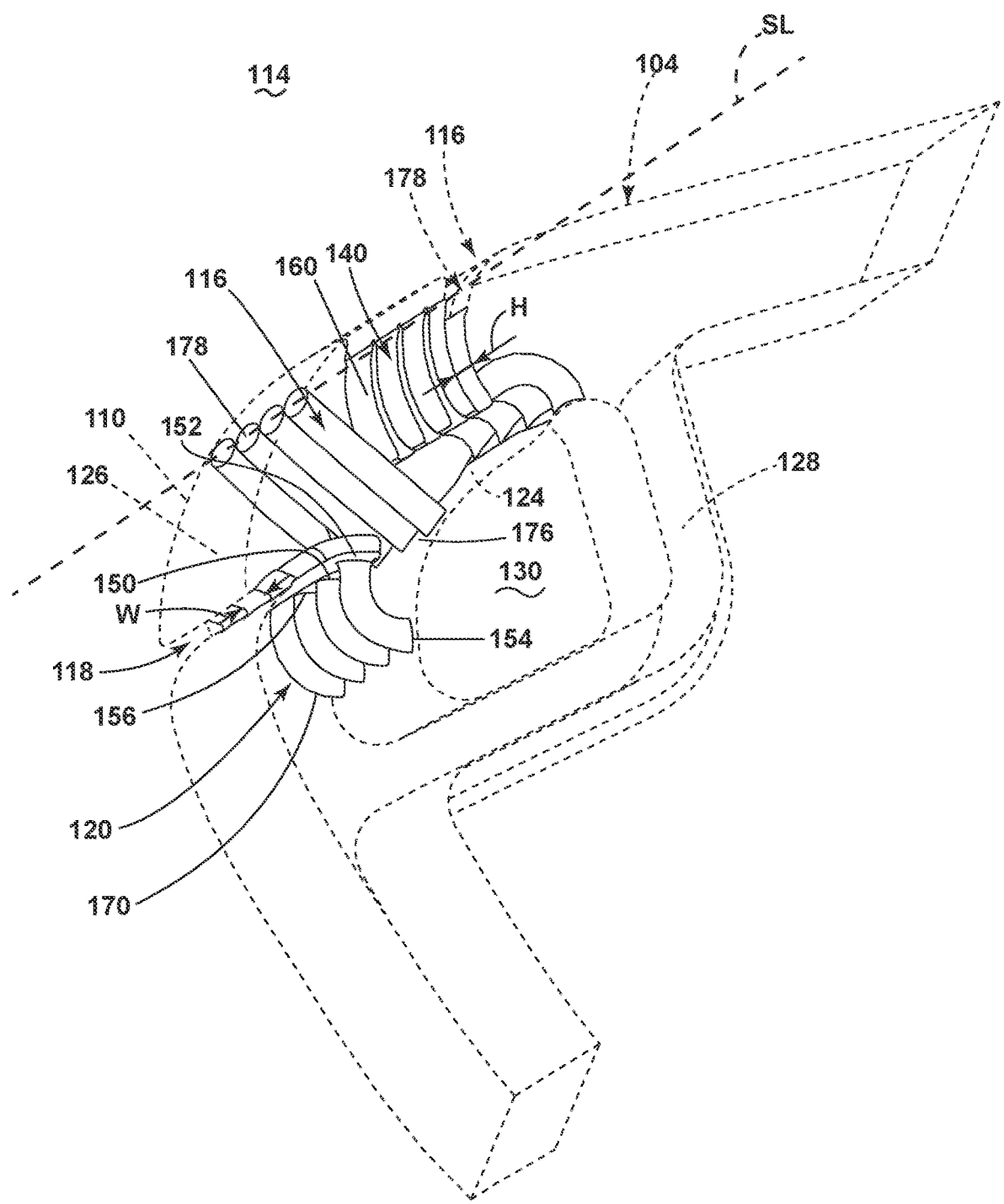
FIG. 6 is a perspective view of a portion of the airfoil shown in dashed line with the set of cooling passages shown in solid line.

Referring now to FIG. 6, a perspective view of a portion of the upstream edge 110 of the airfoil 92 is shown in inverted fashion, having the outer wall 104 shown as hollow in dashed lines, and the set of cooling passages 114 shown in solid for better understanding of the geometry of the set of cooling passages 114. It should be understood that a manufactured product would include a solid outer wall 104 and a hollow set of cooling passages 114, and that the inverted fashion of FIG. 6 is shown only to appreciate the three-dimensional geometry of the set of cooling passages 114 extending through the outer wall 104.

The set of cooling passages 114 includes at least one, illustrated as four, stagnation cooling passages 116. Each stagnation cooling passage 116 extends between a stagnation inlet 176 fluidly coupled to the cooling conduit 130 and a stagnation outlet 178 fluidly coupled to the exterior of the airfoil 92 at the outer surface 126. While the stagnation cooling passages 116 are shown as linear cooling holes, it is contemplated that the stagnation cooling passages 116 can have a different geometry, such as curving in the span-wise direction. It should be understood that while illustrated as oriented along the stagnation line (SL), the stagnation cooling passages 116 can be formed along an edge of an engine component, by way of non-limiting example the upstream edge 110 as described herein.

The secondary cooling passage portion 142 can terminate at the intermediate outlet 156 meeting the diffusion slot 160 at the junction 152. The junction 152 can be a common junction shared by adjacent diffusion slots 160. Discrete diffusion slots 160 and junctions 152 are also contemplated. The diffusion slots 160 can include a curved-planar geometry that is wider than that of the primary cooling passage portion 142 in the span-wise direction. The curved planar geometry refers to a substantially constant height (H) measured in the streamwise direction, while having a width (W) that diverges in the chord-wise plane approaching the outer surface 126. The curved geometry helps to lay down a cooling film along the outer surface 126 of the airfoil 92, which provides for improved film attachment and effectiveness.

Figure 7:
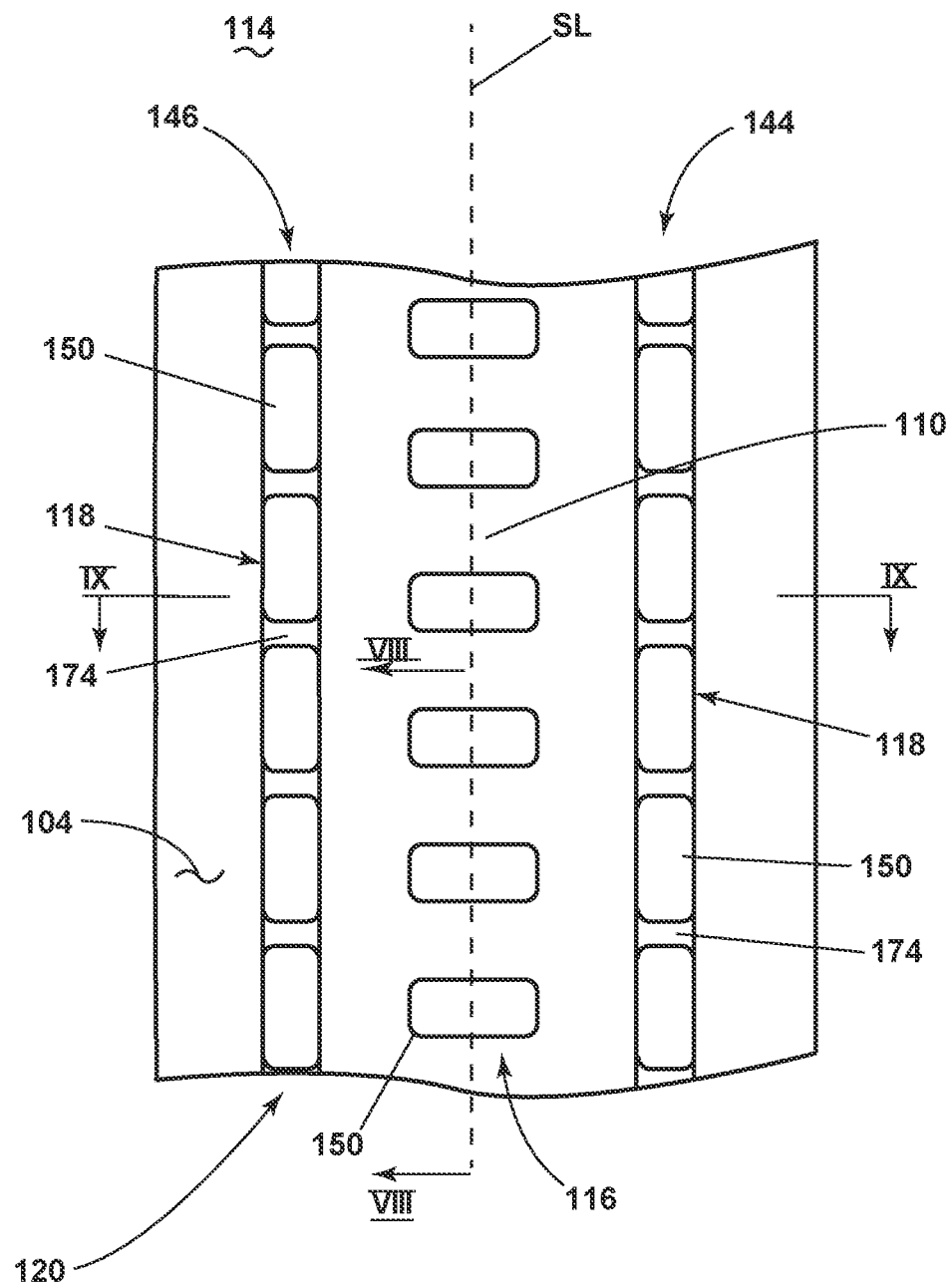
FIG. 7 is a front view of an upstream edge of the airfoil with a variation of the set of cooling passages according to an aspect of the disclosure herein.

Referring now to FIG. 7, a front view of the upstream edge 110 of the airfoil 92 is illustrated with the set of cooling passages 114 including stagnation cooling passages 116 shaped similarly to the slot cooling passages 120 described herein. The stagnation cooling passages 116 can include the diffusion slot 160 (FIG. 6) with rectangular passage outlet 150. While illustrated as rectangular it should be understood that the passage outlet 150 can embody any shape elongated in a direction substantially orthogonal to the stagnation line (SL). While shown as having the passage outlets 150 exhaust to the outlet slots 118, it should be appreciated that the passage outlets 150 can be provided directly along the outer wall 104, and need not include the outlet slots 118, see FIG. 2. Further, while illustrated as including the first side set of cooling passages 144 and the second side set of cooling passages 146, it should be understood that the set of cooling passages 114 can include only the stagnation cooling passages 116.

Figure 8:
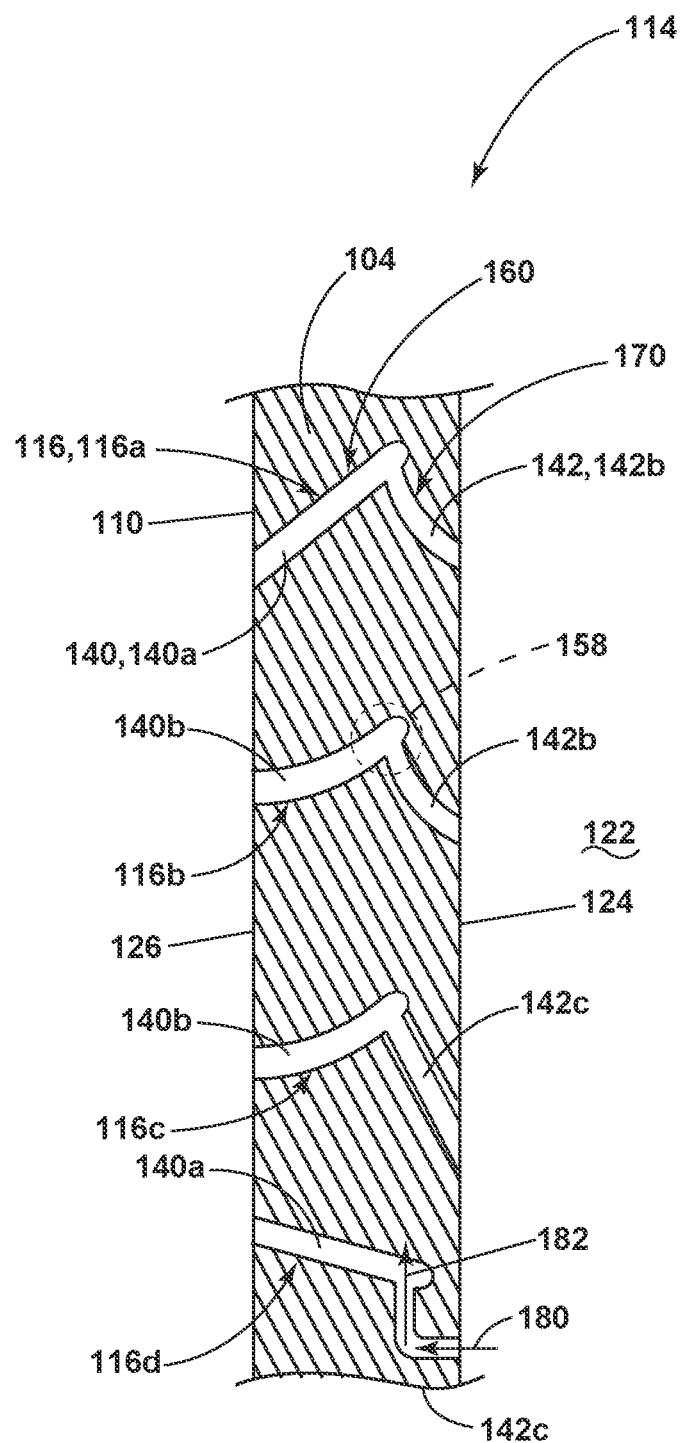
FIG. 8 is a cross-sectional view taken along line VIII-VIII of FIG. 7 showing various geometries for a stagnation cooling passage of the set of cooling passages.

FIG. 8 is a cross-sectional view taken along line VIII-VIII of FIG. 7. The set of cooling passages 114 can include various geometries for the stagnation cooling passages 116 within the outer wall 104. The stagnation cooling passages 116 can be arranged radially, or in the span-wise direction along the stagnation line (SL) to help reduce or eliminate stagnation zones along the upstream edge 110. The stagnation cooling passages 116 illustrated can each include the primary cooling passage portion 140 and the secondary cooling passage portion 142 described herein.

A first stagnation cooling passage 116a can include a linear primary cooling passage portion 140a and a first curved secondary cooling passage portion 142b. The linear primary cooling passage portion 140a can extend in a direction substantially toward the root 96 (bottom of page). The first curved secondary cooling passage portion 142b can curve toward a direction substantially parallel to the stagnation line (SL). For example, opening up toward the tip 94 (top of page) as illustrated.

A second stagnation cooling passage 116b can include a first curved primary cooling passage portion 140b and the first curved secondary cooling passage portion 142b. The curvature of both the first curved primary and secondary cooling passage portions 140b, 142b can be the same as illustrated where both curvatures are opening up toward the tip 94. It is further contemplated that the curvature is opposite, where one curvature can open up toward the tip 94 and the other curvature can open down toward the root 96.

A third stagnation cooling passage 116c can include the first curved primary cooling passage portion 140b and a linear secondary cooling passage portion 142a.

A fourth stagnation cooling passage 116d can include the linear primary cooling passage portion 140a extending in a direction substantially toward the tip 94. A second curved secondary cooling passage portion 142c can have a substantially orthogonal curvature. The second curved secondary cooling passage portion 142c can fluidly couple the linear primary cooling passage portion 140a to the interior 122. Substantially orthogonal meaning turning from a first direction 180 to a second direction 182 within 5% of perpendicular to each other. The first direction 180 can be, by way of non-limiting example toward the outer surface 126, and more specifically toward the upstream edge 110 along the streamwise direction. The second direction 182 can be by way of non-limiting example toward the tip 94 along the spanwise direction.

The primary cooling passage portions 140a, 140b can include the diffusion slot 160 as described herein. Further the primary cooling passage portions 140a, 140b can include the impingement zone 158 described herein. The secondary cooling passage portions 142a, 142b, 142c can include the metering section 170 described herein. The primary cooling passage portions 140a, 140b can extend from the secondary cooling passage portions 142a, 142b in an angled manner in the span-wise direction.

It is further contemplated that the primary cooling passage portions 140a, 140b can curve into or out of the page. Similarly, it is contemplated that the secondary cooling passage portions 142a, 142b can curve into or out of the page, as opposed to the span-wise direction. Therefore, it should be appreciated that the primary and secondary cooling passage portions 140, 140a, 140b, 142, 142a, 142b as described herein can curve in any direction, such as the chord-wise direction, the span-wise direction, or any combination thereof, as well as an axial direction, a radial direction, or a circumferential direction relative to an engine carrying the airfoil or engine component.

Figure 9A:
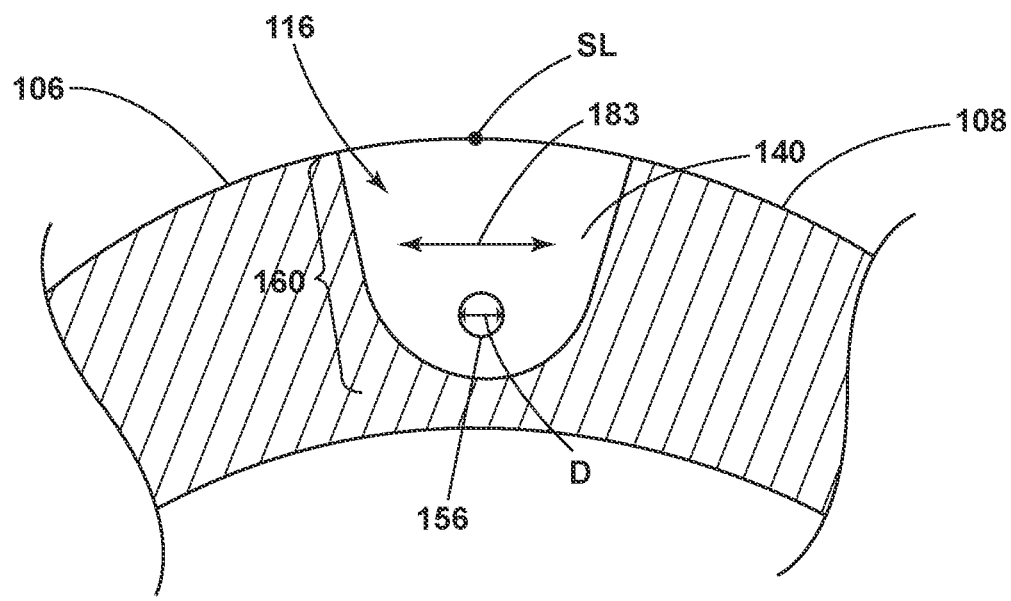
FIG. 9A is a cross-sectional view taken along line IX-IX of FIG. 7 showing the stagnation cooling passage according to an aspect of the disclosure herein.

FIG. 9A is a cross-sectional view along line IX-IX of FIG. 7 of any of the stagnation cooling passages 116a, 116b, 116c, 116d of FIG. 8 simply numbered 116. It can more clearly be seen that the diffusion slot 160 can expand in a third direction 183 substantially orthogonal to the first direction 180 and the second direction 182 as described herein. The third direction 183 can be generally toward/away from the first and second sides 106, 108 as illustrated. It can more clearly be seen that the intermediated outlet 156 can define a diameter (D). While illustrated as circular, it should be understood that if the intermediate outlet 156 has a cross-sectional area with a non-circular shape, the diameter (D) is the hydraulic diameter of the non-circular shape.

Figure 9B:
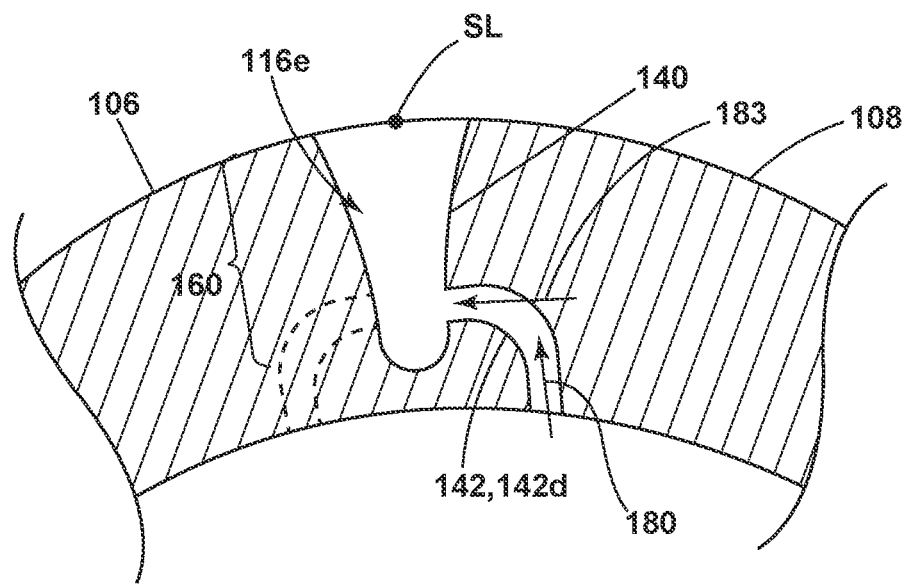
FIG. 9B is a cross-sectional view taken along line IX-IX of FIG. 7 showing a variation of the stagnation cooling passage according to another aspect of the disclosure herein.

FIG. 9B is a cross-sectional view along line IX-IX of FIG. 7 of a variation of an orientation for a fifth stagnation cooling passage 116e according to another aspect of the disclosure herein. The primary cooling passage portion 140 can include the diffusion slot 160 expanding in the third direction 183, substantially orthogonal to the stagnation line (SL). The secondary cooling passage portion 142 can be a third curved secondary cooling passage portion 142d similar to the second curved secondary cooling passage portion 142c previously described herein. The third curved secondary cooling passage portion 142d can curve from the first direction 180 to the third direction 183 substantially orthogonal to the first direction 180. In other words the third curved secondary cooling passage portion 142d can curve away from the second side 108 and toward the first side 106. It should be understood that the third curved secondary cooling passage portion 142d can also be formed as illustrated in dashed line curving away from the first side 106 and toward the second side 108.

With reference to FIGS. 2-9B, it should be appreciated that the set of cooling passages 114 described herein with a primary cooling passage portion 140 having a diffusion slot 160 and a secondary cooling passage portion having the metering section 170 can improve cooling fluid dispersal which provides for overall improved cooling film over the outer surface 126 of the airfoil 92. Additionally, the curvature of both the curved first and second cooling passages 140b, 142b provides for increased length for any of the cooling passages 116, 120 described herein. This can provide for improved cooling film effectiveness. Furthermore, the curved secondary cooling passage portion 142 provides for orthogonal impingement of the cooling fluid on the impingement surface 168 into and into the diffusion slot 160, which improves local cooling of the airfoil 92 or engine component. Alternatively, non-orthogonal impingement is contemplated, and can be utilized where beneficial or arrangement requires non-orthogonal impingement. Similarly, the curved primary cooling passage portion 140 provides for emitting a cooling fluid that is more complementary to the outer surface 126 of the outer wall 104, which provides for improved film attachment over the airfoil 92. Further still, the elongated diffusion slot 160 can provide for wider cooling film dispersal, which can cover a greater area of the airfoil 92 with the cooling film, requiring less total cooling passages, as compared with that of a common 'showerhead' leading edge configurations requiring multiple columns of a plurality of individual holes. Further yet, the passage outlet 150 can provide for yet an even wider cooling film coverage, as compared to utilizing the outlets with smaller shapes such as the stagnation outlet 178 of FIG. 6. Therefore, the set of cooling passages 114 described herein can improve film cooling of the airfoil 92 or engine component, which can provide for decreased required cooling fluid volume, which can improve overall engine efficiency and specific fuel consumption. Additionally, the improved cooling film effectiveness can provide for heightened operational temperatures, which can further improve engine efficiency.

Figure 10:
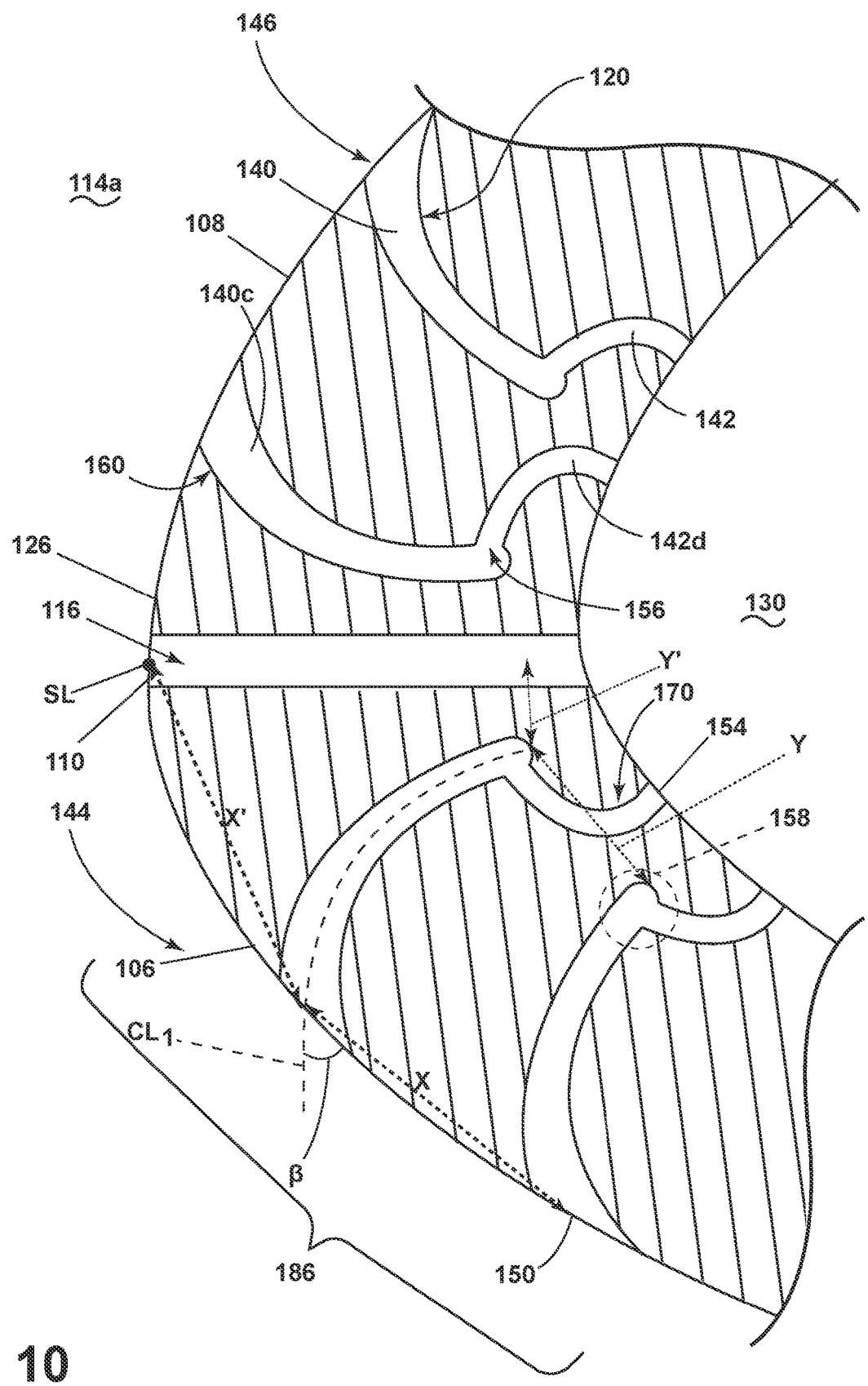
FIG. 10 is an enlarged view of a variation of an arrangement of the set of cooling passages according to another aspect of the disclosure herein.

Referring now to FIG. 10, showing another arrangement of a first set of cooling passages 114a similar to the set of cooling passages 114 described herein. The first set of cooling passages 114a can include the first side set of cooling passages 144 exhausting onto the first side 106 and the second side set of cooling passages 146 exhausting onto the second side 108. The first and second side sets of cooling passages 144, 146 can flank the upstream edge 110 or a stagnation line (SL). The first and second side sets of cooling passages 144, 146 can each include a first pair of slot cooling passages 186 flanking the stagnation cooling passage 116.

Each slot cooling passage 120 of the first pair of slot cooling passages 186 can include the primary cooling passage portion 140 and the secondary cooling passage portion 142 as described herein. The primary cooling passage portion 140 can be a second curved primary cooling passage portion 140c having a curvature that opens away from the stagnation cooling passage 116 and toward either one of the first or second sides 106, 108 depending on which first pair of slot cooling passages 186 of the first and second side sets of cooling passages 144, 146. The primary cooling passage portion 140 can exhaust onto the outer surface 126 at the passage outlet 150. The passage outlet 150 can be spaced from the upstream edge 110 up to 100 diameters (D) measured along the outer surface 126. It is further contemplated that passage outlets 150 for the set of cooling passages 114a are arranged equal to or between 75 and 100 diameters (D) from the upstream edge 110. In other implementations the arrangement can be equal to or between 0 and 75 or 0 and 100 diameters (D). This spacing of the passage outlet 150 and the upstream edge 110 can be implemented for any of the sets of cooling passages 114 described herein. Further the spacing in terms of proximity can be defined in that "proximate" as used herein means within 0 and 100 diameters (D).

The secondary cooling passage portion 142 can be the third curved secondary cooling passage portion 142d as previously described herein, and open toward the stagnation cooling passage 116 as illustrated. It is contemplated that the direction of curvature for the first and secondary cooling passage portions 140, 142 are opposite with respect to each other as illustrated. While illustrated as the first pair of slot cooling passages 186, it should be understood that any number of slot cooling passages 120 can flank the stagnation cooling passage 116. The slot cooling passages 120 can be a pair of sequential cooling passages spaced from each other a first linear distance (X) and a second linear distance (Y). The first linear distance (X) can be measured along a straight line between sequential centers of the slot cooling passages 120 at the outlet 150. The second linear distance (Y) can be measured along a straight line between sequential centers of the slot cooling passages 120 at the rear wall 164. A ratio of X:Y can range between or be equal to 1 and 6. In other words $1 \leq X/Y \leq 6$. In other implementations the ratio of X:Y can range between or be equal to 1 and 2. In other words $1 \leq X/Y \leq 2$. If there is only a single slot cooling passage 120 flanking the stagnation cooling passage 116, then the distance (X) is still the straight line between sequential centers illustrated as (X'), and the distance (Y) is the closest distance between the center of the rear wall of the slot cooling passage 120 and the first centerline of the stagnation cooling passage 116 illustrated as (Y'). In this case the parameter range still holds, $1 \leq X'/Y' \leq 6$. In other implementations $1 \leq X'/Y' \leq 2$. While illustrated in FIG. 10, it should be understood that this range can be applied to any pair of sequential slot cooling passages 120 discussed herein.

The orientation of the diffusion slot 160 can have a curvature such that the curvature of the diffusion slot 160 is complementary to the local curvature of the outer surface 126 of the airfoil 92. A complementary curvature can be defined as having a radius of curvature that is similar to or identical to the local radius of curvature of the outer surface 126 of the airfoil 92. Additionally, an angle β from which the first centerline (CL1) of the diffusion slot at the outer surface 126 can be equal to or between 45-degrees and 90-degrees. The complementary local curvature of the diffusion slot 160 can provide for laying down the cooling fluid as a cooling film along the outer surface 126 even at the steep angle equal to or between 45-degrees and 90-degrees, without requiring the diffusion slot to exhaust a fluid along a small angle, such as 15-degrees. However, it should be understood that angles less than 45-degrees are contemplated, such as equal to or between 30-degrees and 90-degrees, while angles equal to or between 0-degrees and 30-degrees are possible as well.

Such a complementary curvature can provide for reduced fluid separation for the cooling fluid exhausted from the first set of cooling passages 114a, which provides for increased cooling film attachment and cooling film effectiveness. Additionally, multiple stagnation cooling passages 116 and slot cooling passages 120 extending in the span-wise direction can provide for greater coverage of a cooling film over the airfoil 92 at or near the upstream edge 110, which provides for improved film cooling, hotter operational temperatures, reduced cooling bleed air, increased engine efficiency, and decreased overall specific fuel consumption.

While illustrated as a linear stagnation cooling passage 116, it should be understood that the stagnation cooling passage 116 can be any of the stagnation cooling passages 116a, 116b, 116c, 116d, 116e described herein.

Figure 11:
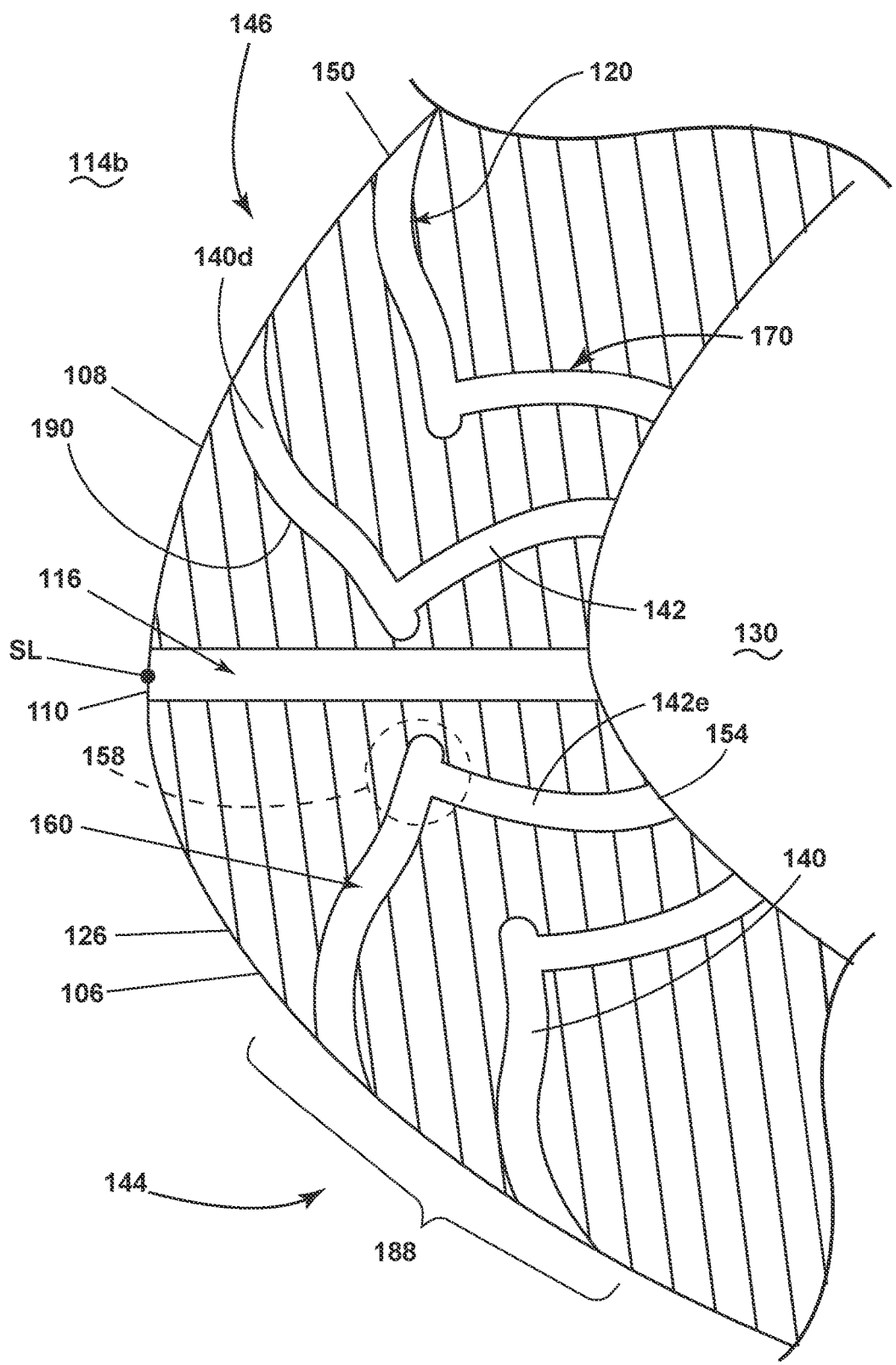
FIG. 11 is an enlarged view of another variation of an arrangement of the set of cooling passages according to another aspect of the disclosure herein.

Referring now to FIG. 11, showing another arrangement of a second set of cooling passages 114b similar to the set of cooling passages 114 described herein. The second set of cooling passages 114b can include the first side set of cooling passages 144 exhausting onto the first side 106 and the second side set of cooling passages 146 exhausting onto the second side 108. The first and second side sets of cooling passages 144, 146 can flank the stagnation line (SL). The first and second side sets of cooling passages 144, 146 can each include a second pair of slot cooling passages 188 flanking the stagnation cooling passage 116.

Each slot cooling passages 120 of the first pair of slot cooling passages 186 can include the primary cooling passage portion 140 and the secondary cooling passage portion 142 as described herein. The primary cooling passage portion 140 can be an inflected primary cooling passage portion 140d having a curvature that includes at least one inflection point 190. The inflection point 190 can define a change in curvature from opening toward the upstream edge 110 to away from the upstream edge 110 as illustrated. It should be understood that the opposite orientation is also contemplated. The two-part geometry for the inflected primary cooling passage portion 140d enables a more orthogonal orientation at the junction 152 providing for improved local impingement cooling in the impingement zone 158. The two-part geometry also provides for a complementary curvature to the outer surface 126, similar to that described with respect to FIG. 10. In this way, the complex, two-part geometry can simultaneously increase local impingement cooling and improve film attachment exhausting along the outer surface 126.

The secondary cooling passage portion 142 can be a fourth curved secondary cooling passage portion 142e having a curvature that opens toward the stagnation cooling passage 116. The third and fourth curved secondary cooling passage portions 142d, 142e differ in that the third curved secondary cooling passage portion 142d is substantially orthogonal while the fourth curved secondary cooling passage portion 142e is subtle having a change in direction that defines an obtuse angle. While illustrated as the second pair of slot cooling passages 188, it should be understood that any number of slot cooling passages 120 can flank the stagnation cooling passage 116.

While illustrated as a linear stagnation cooling passage 116, it should be understood that the stagnation cooling passage 116 can be any of the stagnation cooling passages 116a, 116b, 116c, 116d, 116e described herein.

Figure 12:
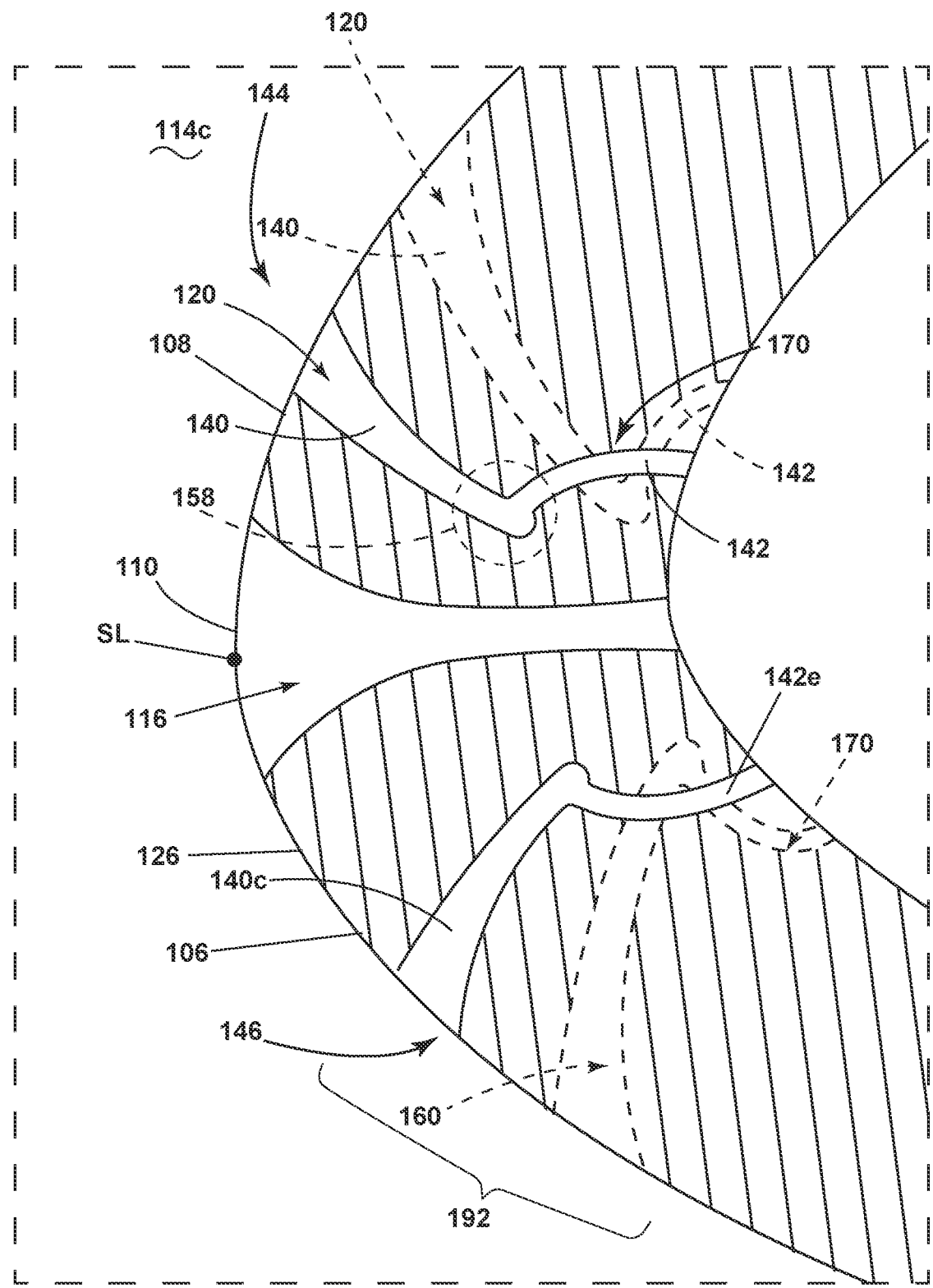
FIG. 12 is an enlarged view of yet another variation of an arrangement of the set of cooling passages according to yet another aspect of the disclosure herein.

Referring now to FIG. 12, showing another arrangement of a third set of cooling passages 114c similar to the set of cooling passages 114 described herein. The third set of cooling passages 114c can include the first side set of cooling passages 144 exhausting onto the first side 106 and the second side set of cooling passages 146 exhausting onto the second side 108. The first and second side sets of cooling passages 144, 146 can flank the stagnation line (SL). The first and second side sets of cooling passages 144, 146 can each include a third pair of slot cooling passages 192 flanking the stagnation cooling passage 116.

The stagnation cooling passage 116 is illustrated as the slot cooling passages described previously herein. The third pair of slot cooling passages 192 can be similar to the first and second pairs of slot cooling passages 186, 188 previously described herein. By way of non-limiting example, the third pair of slot cooling passages 192 can include the second primary cooling passage portion 140c and the fourth secondary cooling passage portion 142e. In the third pair of slot cooling passages 192 adjacent rows of slot cooling passages 120 can overlap one another in the span-wise direction. The overlap need not be only in the span-wise direction, but can be both the span-wise and chord-wise direction, such that one or more cooling passages are intertwined with one another. Furthermore, such overlap or intertwining need not be limited to only two adjacent rows of slot cooling passages 120, but can include multiple rows of slot cooling passages 120 or discrete local slot cooling passages 120, which can be positioned based upon local cooling or film hole needs. Therefore, it should be appreciated that an intertwined or overlapped configuration for the slot cooling passages 120 is contemplated. In this way, local cooling can be increased or decreased proximate the upstream edge 110 where a greater concentration of slot cooling passages 120 can provide for greater local cooling where beneficial.

While illustrated the stagnation cooling passage 116 is illustrated as a slot cooling passage 120, it should be understood that the stagnation cooling passage 116 can be linear or any of the stagnation cooling passages 116a, 116b, 116c, 116d, 116e described herein.

Figure 13:
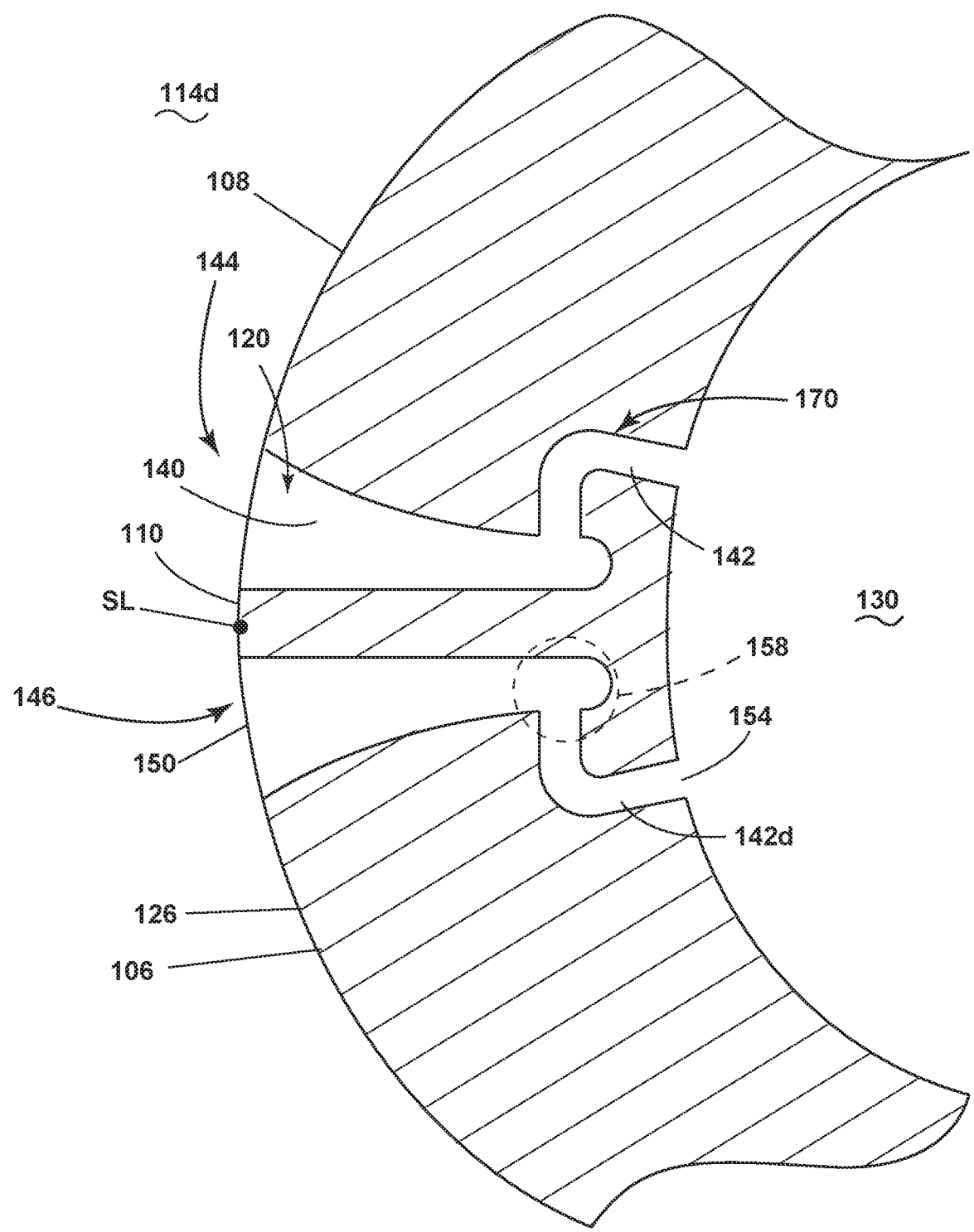
FIG. 13 is an enlarged view of yet another variation of an arrangement of the set of cooling passages according to yet another aspect of the disclosure herein.

Referring now to FIG. 13, showing another arrangement of a fourth set of cooling passages 114d similar to the set of cooling passages 114 described herein. The fourth set of cooling passages 114d can include the first side set of cooling passages 144 exhausting onto the first side 106 and the second side set of cooling passages 146 exhausting onto the second side 108. The first and second side sets of cooling passages 144, 146 can flank the upstream edge 110. Unlike the previous sets of cooling passages described herein, the fourth set of cooling passages 114d is free of a stagnation cooling passage. Rather, the first and second side sets of cooling passages 144, 146 flank the upstream edge 110.

The primary cooling passage portion 140 can be any of the primary cooling passage portions 140a, 140b, 140c, 140d described herein. While illustrated as the third secondary cooling passage 142d, the secondary cooling passage 142 can be any of the secondary cooling passage portions 142a, 142b, 142c, 142d, 142e described herein.

Figure 14:
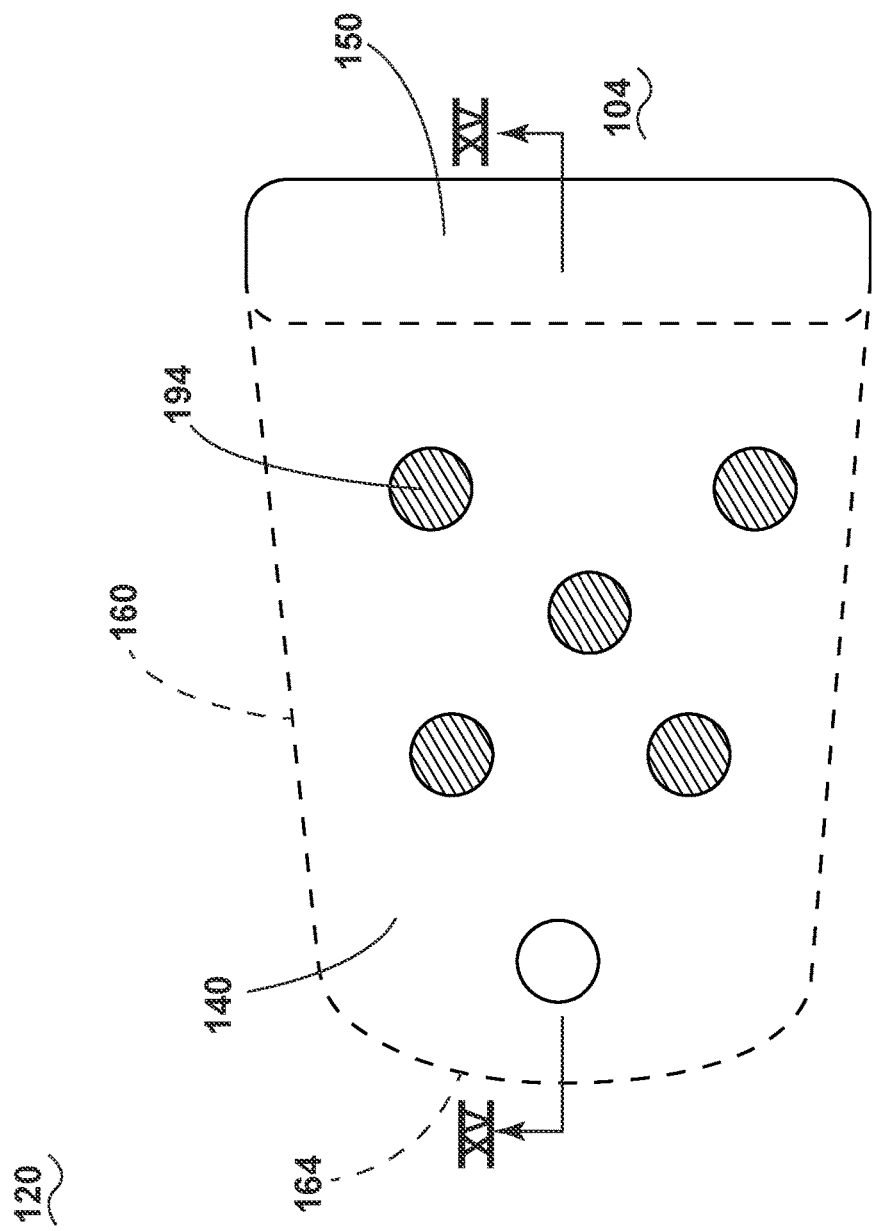
FIG. 14 is a top view of any of the cooling passages illustrated herein with a set of flow enhancers.

FIG. 14 is a top down view of any one of the cooling passages 116, 116a, 116b, 116c, 116d, 116e, 120 described herein, by way of non-limiting example slot cooling passage 120. It is contemplated that any of the cooling passages 116, 116a, 116b, 116c, 116d, 116e, 120 as described herein, can include a set of flow enhancers 194, by way of non-limiting example full height heat transfer coefficient (HTC) augmentation features such as pins, etc., or partial height HTC augmentation features such as turbulators, bumps, dimples, etc. A higher HTC causes an increase in cooling of the outer wall 104 along with an increase in the temperature of the cooling fluid (C). Balancing where the benefit of the cooling in one area outweighs the increase in temperature of the cooling fluid (C) is enabled by placement of the HTC augmentation features.

Figure 15:
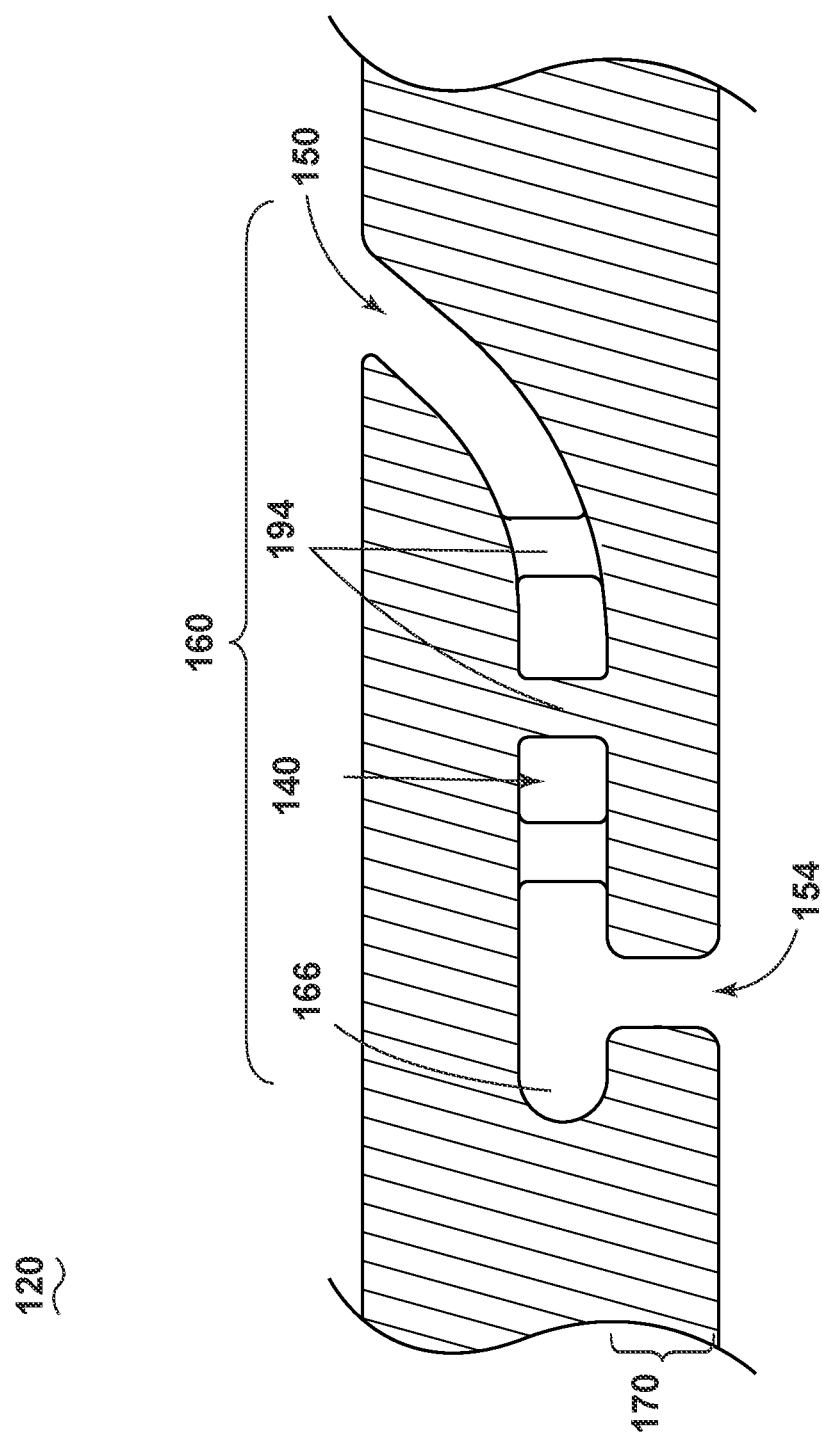
FIG. 15 is a cross-sectional view of FIG. 14 along line XV-XV where the flow enhancers are pins.

As is illustrated in FIG. 15, the set of flow enhancers 194 can be pins extending a full height of the cooling passage 120.

Any of the primary cooling passage portions 140, 140a, 140b, 140c, 140d described herein can include the diffusion slot 160. Further, any of the primary cooling passage portions 140, 140a, 140b, 140c, 140d can include the impingement zone 158 described herein. Additionally, any of the secondary cooling passage portions 142, 142a, 142b, 142c, 142d, 142e can include the metering section 170 described herein.

The cooling passages and concepts described herein provide for improved local cooling, such as improved impingement cooling with the fluid dispensed from the metering section. Furthermore, the diffusion slot can provide for a greater surface area for convective cooling of the airfoil, as well as providing for a wider layer of cooling film along the exterior of the airfoil, which provides for a more effective cooling film with greater attachment. The improved cooling can require less cooling air, which can require less bleed air. The lesser amount of required cooling air can lead to increased engine efficiency and decreased specific fuel consumption. Furthermore, the improved film cooling can provide for greater operational temperatures, which can increase engine efficiency, as well as improve component lifetime and reduce maintenance.

While the wall of the engine component described herein is illustrated as generally straight with an inner and outer surface parallel to each other, the engine component, or the airfoil as described herein, can be curved and oriented at an angle with respect to the combustion flow. While illustrated as generally consistent or continuously widening, the passage cross section as described herein can be collapsing, widening, etc. allowable variation in both directions. Variation can be nonlinear, nonconstant, etc.

The set of cooling passages as described herein can include at least two cooling passages that have passage outlets that are merged together, forming a trench on the outer surface. It is further contemplated that all the cooling passages in the set of cooling passages have passage outlets that merge together to form a trench on the outer surface. The trench can extend radially along the airfoil.

It should be appreciated that the cooling passages as described herein can be provided in any portion of an airfoil or engine component. Furthermore, it should be appreciated that the cooling passages as described herein can have additional applicability to other portions of an airfoil, such as the leading edge, the trailing edge, the pressure side, the suction side, the tip, the root, or even an interior structure of the airfoil, for example. Further still, the cooling hole geometry can have applicability in other engine components, beyond that of an airfoil, such as in a blade, a vane, a strut, a shroud, or a combustor liner in non-limiting examples.

The cooling passages and other complex geometries as described herein can be formed, for example, by additive manufacturing, while traditional methods of manufacture are contemplated. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. Additive manufacturing, such as 3D printing, direct metal laser melting, direct metal laser sintering, or electroforming, can provide for forming the complex geometries as described herein, where such formation by way of traditional manufacture, such as casting or drilling, can be challenging, costly, or time consuming, as well as having poor yields. Further the cooling passages described herein can be produced via indirect additive method, i.e. print the cores and cast, or casting via additively producing a core, or making the core via RMC can also be utilized.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An engine component for a turbine engine having a working airflow separated into a cooling airflow and a combustion airflow, the engine component comprising: a wall defining an interior and having an outer surface over which flows the combustion airflow, the outer surface defining a first side and a second side and having an edge, at least one cooling conduit provided in the interior and having conduit sidewalls; a set of cooling passages formed in the wall and fluidly coupling the at least one cooling conduit to the outer surface, at least one of the cooling passages in the set comprising: a primary cooling passage portion extending between an intermediate outlet and a passage outlet opening onto the outer surface proximate the edge; a second passage portion extending between an inlet fluidly connected to the at least one cooling conduit and the intermediate outlet, the first and second passage portions together defining the at least one cooling passage extending along a flow direction between the inlet and the passage outlet; a diffusion slot located in the primary cooling passage portion and extending along the flow direction between a rear wall and the passage outlet, the diffusion slot having slot sidewalls defining a slot first centerline, an impingement zone fluidly coupled to the diffusion slot proximate the rear wall, having an impingement surface, and fluidly connected to the secondary cooling passage portion at a junction proximate the rear wall and opposite the impingement surface.

The engine component of any preceding clause wherein at least one of the first or secondary cooling passage portions are curved.

The engine component of any preceding clause wherein the secondary cooling passage portion is a curved passage.

The engine component of any preceding clause wherein the diffusion slot is a curved diffusion slot and the curved diffusion slot and the curved passage are curved in opposite directions.

The engine component of any preceding clause wherein the primary cooling passage portion is curved and includes an inflection point.

The engine component of any preceding clause wherein the outer surface extends between an upstream edge and a downstream edge to define a chord-wise direction and between a root and a tip to define a span-wise direction.

The engine component of any preceding clause wherein the set of cooling passages are located on the upstream edge.

The engine component of any preceding clause wherein the flow direction extends in a span-wise direction along at least a portion of the curved passage.

The engine component of any preceding clause wherein the set of cooling passages is multiple cooling passages flanking the edge, extending in the span-wise direction, and located proximate to or at the upstream edge.

The engine component of any preceding clause wherein the multiple cooling passages include a first side set of cooling passages and a second side set of cooling passages flanking the edge.

The engine component of any preceding clause further comprising at least one stagnation passage extending between a stagnation inlet fluidly connected to the at least one cooling conduit and a stagnation outlet located along the edge.

The engine component of any preceding clause further comprising an outlet slot extending along the outer surface in the span-wise direction and the diffusion slot opens into the outlet slot.

The engine component of any preceding clause wherein the intermediate outlet is spaced from the rear wall to define a pocket.

The engine component of any preceding clause wherein the secondary cooling passage portion comprises a metered section.

A method of cooling an engine component having an outer wall defining an interior, the method comprising flowing a cooling fluid into the interior of the engine component; turning the cooling fluid from a first direction to a second direction different than the first direction through a curved passage; impinging the cooling fluid on an impingement surface located in a diffusion slot in the outer wall; diffusing the cooling fluid to an exterior of the engine component through the diffusion slot; and exhausting the cooling fluid at a passage outlet along an edge at or proximate to an upstream edge of the engine component.

The method of any preceding clause further comprising exhausting the cooling fluid from the diffusion slot through a passage outlet opening onto an outer surface of the outer wall in a third direction different than the first or second directions.

The method of any preceding clause further comprising exhausting the cooling fluid from the diffusion slot through a passage outlet opening onto an outer surface of the outer wall in the first direction.

The method of any preceding clause further comprising expanding the cooling fluid in a span-wise direction.

The method of any preceding clause further comprising passing the cooling fluid through a stagnation passage extending between the interior and an outer surface of the outer wall.

The method of any preceding clause further comprising exhausting the cooling fluid at a stagnation outlet at the edge.

What is claimed is:

1. An engine component for a turbine engine having a working airflow separated into a cooling airflow and a combustion airflow, the engine component comprising:
    a wall defining an interior and having an outer surface over which flows the combustion airflow, the outer surface defining a first side and a second side and having an edge,
    at least one cooling conduit provided in the interior and having conduit sidewalls;
    a set of cooling passages formed in the wall and fluidly coupling the at least one cooling conduit to the outer surface, at least one of the cooling passages in the set comprising:
        a primary cooling passage portion extending between an intermediate outlet and a passage outlet opening onto the outer surface proximate the edge;
        a secondary cooling passage portion extending between an inlet fluidly connected to the at least one cooling conduit and the intermediate outlet, the primary and secondary cooling passage portions together defining the at least one cooling passage extending along a flow direction between the inlet and the passage outlet;
        a diffusion slot located in the primary cooling passage portion and extending along the flow direction between a rear wall and the passage outlet, the diffusion slot having slot sidewalls defining a slot first centerline,
        an impingement zone fluidly coupled to the diffusion slot proximate the rear wall, having an impingement surface, and fluidly connected to the secondary cooling passage portion at a junction proximate the rear wall and opposite the impingement surface.

2. The engine component of claim 1 wherein at least one of the primary or secondary cooling passage portions are curved.

3. The engine component of claim 1 wherein the secondary cooling passage portion is a curved passage.

4. The engine component of claim 3 wherein the diffusion slot is a curved diffusion slot and the curved diffusion slot and the curved passage are curved in opposite directions.

5. The engine component of claim 1 wherein the primary cooling passage portion is curved and includes an inflection point.

6. The engine component of claim 1 wherein the outer surface extends between an upstream edge and a downstream edge and between a root and a tip to define a span-wise direction.

7. The engine component of claim 6 wherein the set of cooling passages are located on the upstream edge.

8. The engine component of claim 7 wherein the flow direction extends in the span-wise direction along at least a portion of at least one of the cooling passages.

9. The engine component of claim 6 wherein the set of cooling passages is multiple cooling passages flanking the edge, extending in the span-wise direction, and located proximate to or at the upstream edge.

10. The engine component of claim 9 wherein the multiple cooling passages include a first side set of cooling passages and a second side set of cooling passages flanking the edge.

11. The engine component of claim 6 further comprising an outlet slot extending along the outer surface in the span-wise direction and the diffusion slot opens into the outlet slot.

12. The engine component of claim 1 further comprising at least one stagnation passage extending between a stagnation inlet fluidly connected to the at least one cooling conduit and a stagnation outlet located along the edge.

13. The engine component of claim 1 wherein the intermediate outlet is spaced from the rear wall to define a pocket.

14. The engine component of claim 1 wherein the at least one cooling passage is a pair of sequential cooling passages spaced from each other a first linear distance between sequential centers of the cooling passages at the passage outlet and a second linear distance is a closest distance between sequential centers of the cooling passages where a ratio between the first linear distance and the second linear distance is equal to or between 1 and 6.

15. A method of cooling the engine component of claim 1, the method comprising:

flowing a cooling fluid into the interior of the engine component;
turning the cooling fluid from a first direction to a second direction different than the first direction through a curved passage;
impinging the cooling fluid on the impingement surface located in the diffusion slot in the outer wall;
diffusing the cooling fluid to an exterior of the engine component through the diffusion slot; and
exhausting the cooling fluid at the passage outlet.

16. The method of claim 15 further comprising exhausting the cooling fluid from the diffusion slot through the passage outlet opening onto an outer surface of the outer wall in a third direction different than the first or second directions.

17. The method of claim 15 further comprising exhausting the cooling fluid from the diffusion slot through the passage outlet opening onto an outer surface of the outer wall in the first direction.

18. The method of claim 15 further comprising expanding the cooling fluid in a span-wise direction.

19. The method of claim 15 further comprising passing the cooling fluid through a stagnation passage extending between the interior and an outer surface of the outer wall.

20. The method of claim 19 further comprising exhausting the cooling fluid at a stagnation outlet at the edge.

* * * * *